(No Model.) 3 Sheets—Sheet 3.

G. A. & J. P. CULVER & W. D. OTIS.
PURIFIER AND SEPARATOR.

No. 493,756. Patented Mar. 21, 1893.

WITNESSES:
H. Weber.
O. Albrecht

George A. Culver
John P. Culver
Willard D. Otis
INVENTORS

BY G. W. Snow
ATTORNEY.

UNITED STATES PATENT OFFICE.

GEORGE A. CULVER, JOHN P. CULVER, AND WILLARD D. OTIS, OF BLUE SPRINGS, NEBRASKA.

PURIFIER AND SEPARATOR.

SPECIFICATION forming part of Letters Patent No. 493,756, dated March 21, 1893.

Application filed August 10, 1891. Renewed November 15, 1892. Serial No. 452,027. (No model.)

*To all whom it may concern:*

Be it known that we, GEORGE A. CULVER, JOHN P. CULVER, and WILLARD D. OTIS, all of Blue Springs, in the county of Gage and State of Nebraska, have invented certain useful Improvements in Purifiers and Separators; and we do hereby declare that the following is a full, clear, and exact description of the invention, such as will enable others skilled in the art to which it appertains to make and use the same, reference being had to the accompanying drawings, which form a part of this specification.

This invention relates to improvements in milling machinery, and comprises a new and novel dust collector and purifier.

The object of this invention is, to provide a combined dust collector and separator, wherein a continuous and recurrent air belt is made to serve in collecting and grading the lighter particles of grain as well as the fluff and dust, as will be described more fully hereinafter, and finally pointed out in the claims.

Figure 1:
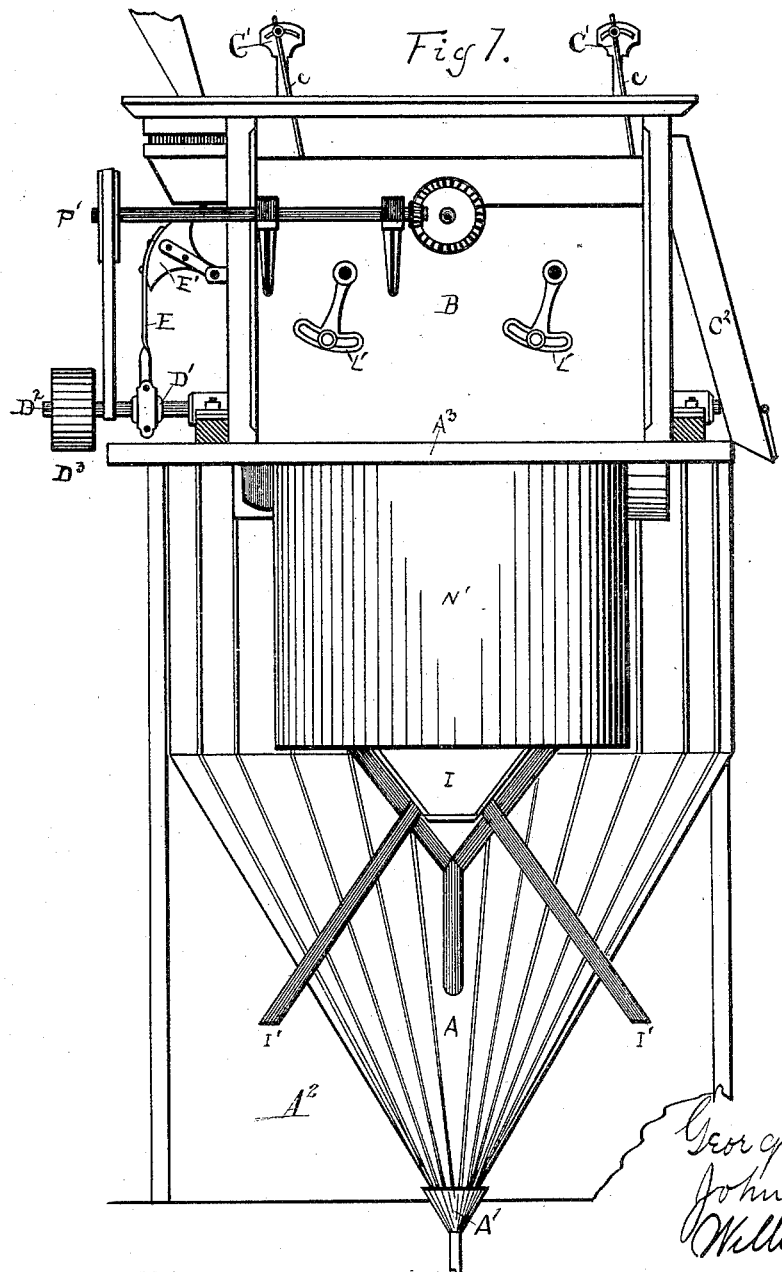
Figure 2:
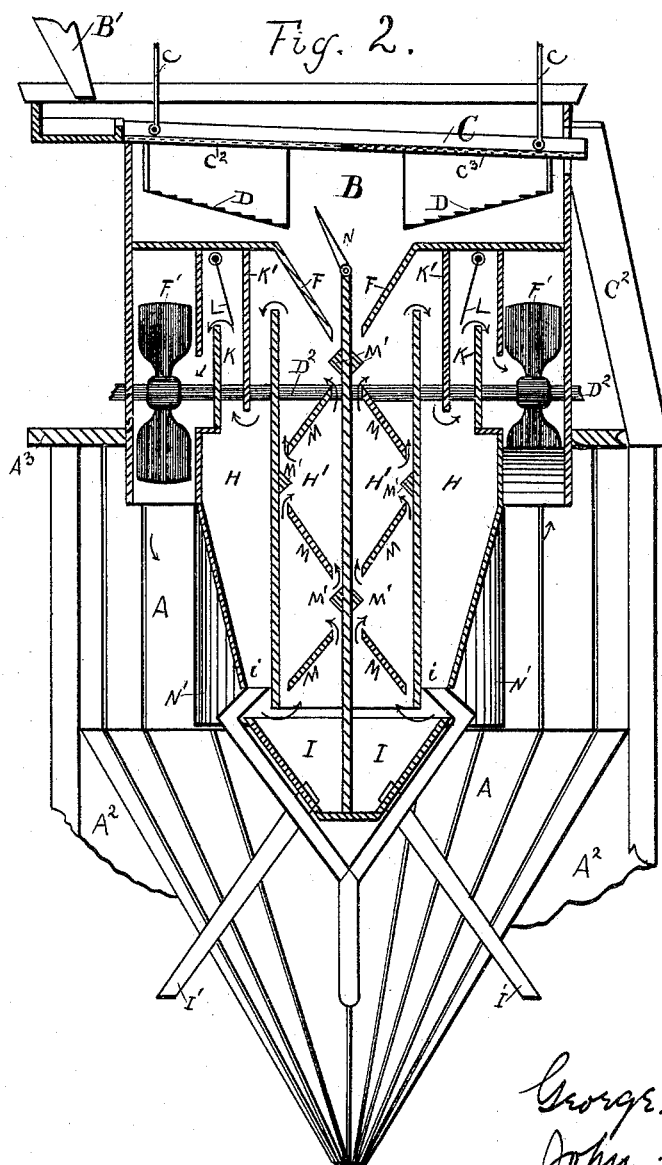
Figure 3:
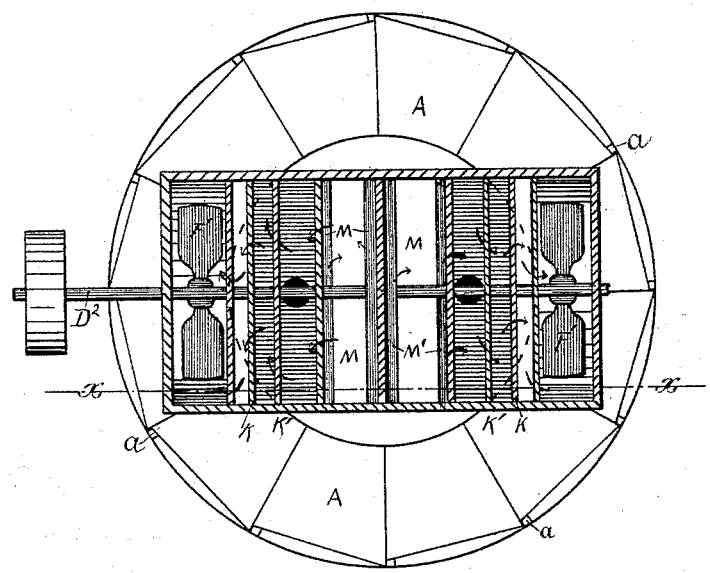
Figure 4:
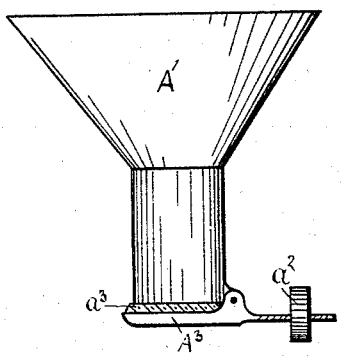

In the accompanying drawings Figure 1 shows a dust collector and separator embodying our invention, with parts broken away. Fig. 2 represents a vertical sectional view with parts broken away. Fig. 3 shows a horizontal sectional view, while Fig. 4 shows the arrangements of the trap valve.

Similar letters of reference refer to corresponding parts.

Suspended from below a platform within a suitable supporting casing $A^2$, we have arranged a dust-collector A. This collector is in the shape of an inverted pyramid, extending from a body portion, the outline of which in cross section is in the form of a dodecagon. The bounding planes however are united by means of wooden supporting strips $a$, $a$, over which the planes, which are preferably of sheet iron, are alternately lapped so as to form an angle, as will be understood by referring to Fig. 3. The collector may be attached to the platform by means of an iron supporting rim, or directly by means of its bent edges. Below, the pyramid is a hopper A', having a trap valve $A^3$. This valve, as shown in Fig. 4, comprises the plate $A^3$, which is pivotally connected to the hopper, and provided with a threaded stem, upon which is adjustably held the counterpoise $a^2$. To insure a snug seating of the valve, we provide the valve plate with the felt disk $a^3$, which works against the seating as shown.

Fixed upon the supporting standard $A^2$, and extending partly into the pyramidal shaped collector A, is the aspirating trunk B. This trunk is square, preferably of wood, partly open at its lower end and provided within its closed top near one end, with an opening adapted to receive the feeding spout B', as shown. Mounted below the spout B', and reciprocating horizontally within the upper portion of the trunk, is a suspended vibrating frame C, over which the middlings are fed into the trunk. This vibrating frame C, is suspended by means of four pivoted bars $c$, which are adjustably held within the standards C', which are mounted at convenient points upon the deck of the trunk B. The first half, or that nearest the spout B', of the frame, is covered with a fine bolting cloth, $c^2$, while the remaining portion is covered with a coarser cloth $c^3$. Reciprocating below these bolting cloths are the usual cleaners, as employed in all machines of this class, but which not forming part of our invention, have not been shown.

Attached to the lower portion of the vibrating frame C, are two converging corrugated gathering boards D, D, one for each of the bolting cloths $c^2$, $c^3$. These gathering boards are scooped shaped, declining toward the center, where they terminate above a central chute or flue within the trunk into which they feed the bolted material. The frame C as well as the connected gathering boards, is given a vibrating reciprocating motion, by means of an eccentric D', which is mounted upon a main driving shaft $D^2$ passing transversely through the trunk B as will be understood by referring to Figs. 2 and 3. A strap E is secured to the eccentric D' and passing over a pivoted quadrant E' to which it is fastened, is fixed to the frame C, so as to work said frame, and forming in its operation what is known as a shake feed. The end of the frame C opposite the spout projects into the chute C" into which the tailings are fed.

The compartment, within which the vibrating frame C operates, has a central transverse opening, formed by the two depending deflecting-boards F, F, which extend into a central flue or chute passing vertically through the trunk B and into the collector A, as illustrated. The main driving shaft $D^2$ which passes centrally and transversely through the trunk B, is provided with a driving pulley $D^3$, an eccentric D' and the blast fans F', F'. These fans which are as ordinarily constructed are mounted within the trunk at opposite sides, and within two compartments provided for that purpose. These compartments or boxes extend below the platform $A^3$ and are open at one side, so as to form tangential inlets facing in opposite directions, so that the currents from both fans will circle about the collector in the same direction, as will be understood by referring to Fig. 3. The space between the two fan boxes is divided into four separate compartments or settling chambers marked H, H, and H', H'. The chambers H, H, extend to the closed bottom of the trunk proper, from which suitable tubes i, i, are extended to a common junction below, and thence to a point without the collector. The compartments H', H' are open-ended and terminate above a duplex chamber I, from which the delivery tubes I', I' are extended. The chamber I is in a position below the central chute formed by the compartments H', H', so as to allow a flue opening offering communication between the chute and the pyramidal collector, as illustrated.

Within each of the chambers H, H, are two partitions, marked K, K, and K', K'. The partitions marked K, K are positioned in front of the fan eyes leading into the fan boxes and upward, while the partitions K', K', are fixed to the top of the chamber, and extend downward a suitable distance below the shaft $D^2$. The partitions K, K extend upward approximately one-half the height of the chamber, while the depending partitions are fixed centrally within the chambers H, H, as will be noticed by referring to Fig. 2.

Pivotally mounted above the partitions K, K are the valves L, L, by means of which the flue openings between the fan boxes and chambers H, H, may be regulated. The handles L', L', extending from the shafts of these valves, extend without the trunk, and may be locked in any desired position, as shown in Fig. 1.

Transversely within the settling chambers H', H', is a series of fixed deflecting boards M, M, terminating above and below the blocks M', M', while a swinging valve N is pivotally mounted at the upper end of the central partition dividing the chute into the two settling chambers, so that the bolted material from both the gathering boards D, D, may be led into one chamber, if desired.

The settling trunk B, below the platform, $A^3$ is surrounded by a sheet iron drum N', as shown.

When all the instrumentalities have been properly assembled to form our improved separator, the operation of our device is as follows: The middlings to be purified are spouted into the separating trunk through the chute B', upon the bolting frame C over which they are fed in an even sheet, working through the bolting cloths upon the gathering boards D, D, in two grades, into the chambers H', H'. During this operation, power is applied to the shaft $D^2$, which is in belt connection with the shaft P of the bolt cleaners, and at the same time operates the bolting frame as described. The whole device is practically air-tight, so that the fans F', F', start a centrifugal air current which being propelled, from the tangential outlets of the fan boxes circles about the collector, outside of the drum N', from whence it passes up the two settling chambers H', H', entering above the chamber I, and escaping through the interstices between the ends of the deflecting boards M and the sides of the chute, striking the boards F, F. The middlings which have been fed into the chambers H', H', are spread as they successively strike the deflecting boards M, M, and are thus repeatedly subjected to the air current passing up the chambers. This current of course carries all the fluff, impurities and lighter particles of grain with it, as it passes into the settling chambers marked H, H, where the coarser particles are deposited as the current passes upward preparatory to entering the fan boxes, from which it is driven dust laden around the collector A. As the current sweeps about the collector it successively and repeatedly forms into small eddies, in passing over the abrupt terminations of the faces of the pyramidal shaped receptacle. The dust is whirled about the angles formed by the connected face plates, until it gradually works toward the bottom of the collector, where it is collected upon the balanced trap valve $A^3$, until its weight overbalances the trap valve, when it is permitted to escape into a receptacle below. As the fans are continually operated during the process of purifying, a continuous current is formed, which collects and thus prevents the escape of any and all the fine floating particles. By means of our invention these fine particles are not only prevented from leaving the separator, but they are retained and graded and in accomplishing this the device fulfills the aim and object of our invention; and

Having thus described our said invention and the best means we know of arranging the same, what we claim as new, and desire to secure by United States Letters Patent, is—

1. In a purifier and separator, the combination with a dust collector comprising a polygonal shaped body portion having a lower pyramidal shaped section, of an openended aspirating trunk at the upper end and extending into said collector, a cylindrical drum centrally within said collector and surrounding the projecting end of said trunk, and a suspended horizontally reciprocating bolting frame centrally above said trunk, provided with converging corrugated gathering boards, adapted to catch and feed the grain centrally into said trunk, substantially as and for the purpose set forth.

2. In a dust collector and separator, the combination with the inclosing casing, of an open ended aspirating trunk extending into said casing, and being divided into one main and four sub compartments as follows: an upper main chamber the width and length of the trunk and having a central transverse opening, a transverse main partition centrally dividing the trunk into two compartments and extending into the upper chamber, two secondary partitions dividing the trunk into two separate chambers, one upon each side of the central partition, to form two central chutes and a settling chamber on either side, a divided hopper below said central chute, spouts leading from said hopper and from the settling chambers, and two fan boxes in communication with all of said chambers, fans within said boxes and means for operating the same, substantially as and for the purpose set forth.

3. In a purifier and separator, the combination of a dust collector comprising a polygonal shaped body terminating in a cone, the planes of which are lapped and united by longitudinal ribs so as to form successively a series of angular vertical recesses or abutments, extending the full length of the collector, an openended aspirating trunk extending into said collector, provided with an upper chamber adapted to accommodate a bolting frame and centrally leading into a duplex chute, settling chambers upon each side of said chute and communicating with said chutes at their upper ends, fan boxes positioned below said main chamber and communicating with said settling chambers and having outlets leading into the dust collector proper, a driving shaft passing centrally through the duplex chutes, the settling chambers and the fan boxes being supported upon the outside within suitable bearings, fans upon said shaft and within said fan boxes, and means for operating said shaft, all substantially as and for the purpose set forth.

4. In a purifier and separator, the combination of a dust collector comprising a polygonal shaped body terminating in a cone, the planes of which are lapped and united by longitudinal ribs so as to form successively a series of angular vertical recesses or abutments, extending the full length of the collector, an openended aspirating trunk extending into said collector, comprising a main upper chamber below which are positioned two central chutes leading into said main chamber, two settling chambers two fan boxes, a depending deflecting board extending into each of said settling chambers, transverse angular bars within said central chutes arranged successively upon opposite sides of the chutes and inclined deflecting bars within said chutes, and a hopper below said central chutes, all substantially as and for the purpose set forth.

5. The combination with a polygonal and pyramidal shaped inclosing dust collector, of an aspirating trunk, said trunk having an upper chamber adapted to accommodate a horizontally reciprocating bolting frame, an opening leading into a central duplex chute terminating above a duplex settling chamber, said chutes leading into two auxiliary settling chambers, spouts leading from said chamber, transverse and inclined deflecting bars and boards within said chutes, fan boxes leading into said chambers, valves within said fan boxes for regulating the force of the current, a main driving shaft passing through said aspirating trunk, fans upon said shaft, and an eccentric connection in combination with said driving shaft to operate the said bolting frame, all substantially as and for the purpose set forth.

In testimony whereof we affix our signatures in presence of two witnesses.

GEORGE A. CULVER.
JOHN P. CULVER.
WILLARD D. OTIS.

Witnesses:
B. FRITZ,
W. H. WILSON.